United States Patent [19]

Dhein et al.

[11] 4,186,116

[45] Jan. 29, 1980

[54] AIR-DRYING AND OVEN-DRYING ACRYLATE LACQUER BINDERS

[75] Inventors: Rolf Dhein; Lothar Fleiter; Wolfgang Beer, all of Krefeld, Fed. Rep. of Germany

[73] Assignee: Bayer Aktiengesellschaft, Leverkusen, Fed. Rep. of Germany

[21] Appl. No.: 917,378

[22] Filed: Jun. 20, 1978

[30] Foreign Application Priority Data

Jun. 24, 1977 [DE] Fed. Rep. of Germany ....... 2728568

[51] Int. Cl.$^2$ .................. C09D 3/52; C09D 3/80; C09D 3/81
[52] U.S. Cl. .................. 260/23 AR; 260/21
[58] Field of Search .................. 260/23 AR

[56] References Cited

U.S. PATENT DOCUMENTS

| | | | |
|---|---|---|---|
| 3,284,385 | 11/1966 | D'Alelio | 260/23 AR |
| 3,288,736 | 11/1966 | Wright et al. | 260/23 AR |
| 3,454,509 | 7/1969 | Fry | 260/23 AR |
| 3,674,731 | 7/1972 | Guldenpfennig | 260/23 S |
| 3,947,528 | 3/1976 | Wingler et al. | 260/23 AR |

FOREIGN PATENT DOCUMENTS

| | | | |
|---|---|---|---|
| 859466 | 1/1961 | United Kingdom | 260/23 AR |
| 896711 | 5/1962 | United Kingdom | 260/23 AR |
| 1045199 | 10/1966 | United Kingdom | 260/23 AR |
| 1104446 | 2/1968 | United Kingdom | 260/23 AR |
| 1227398 | 4/1971 | United Kingdom | 260/23 AR |
| 1399159 | 6/1975 | United Kingdom | 260/23 AR |

*Primary Examiner*—Ronald W. Griffin
*Attorney, Agent, or Firm*—Connolly and Hutz

[57] ABSTRACT

An air-drying and oven-drying lacquer binder based on a copolymer having copolymerized units of 5 to 40% by weight of styrene, 10 to 50% by weight of at least one hydroxyalkyl(-meth)acrylate with 2 to 4 carbon atoms in the alkyl group, and 10 to 40% by weight of at least one (meth)acrylic acid ester with 1 to 10 carbon atoms in the alcohol component, esterified with 10 to 50% by weight, based on the copolymer and drying fatty acid and dicarboxylic acid anhydride, of a drying fatty acid, from 10 to 70 mole % of the hydroxyl groups of the incorporated hydroxyalkyl(meth)acrylate units having been esterified with the drying fatty acid and thereafter from 0.5 to 20 mole % of the hydroxyl groups of the incorporated hydroxyalkyl(meth)acrylate units having been reacted with from 0.5 to 10% by weight, based on the lacquer binder, of at least one dicarboxylic acid cyclic anhydride to form the semiester of the corresponding dicarboxylic acid having an overall acid number of from 5 to 30, the overall acid number being composed of an acid number of from 1 to 10, as determined after esterification with the drying fatty acid and emanating from the free fatty acid, and of acid number of from 1 to 29, as determined on the solvent-free lacquer binder (end product) and emanating from formation of the semiester.

3 Claims, No Drawings

AIR-DRYING AND OVEN-DRYING ACRYLATE LACQUER BINDERS

This invention relates to air-drying and oven-drying lacquer binders based on copolymers of styrene, hydroxyalkyl(meth) acrylates and (meth)acrylates in which the hydroxyl groups are partially esterified with drying fatty acids after production of the copolymers and are subsequently reacted with dicarboxylic acid anhydrides to form semiesters. The lacquer binders have final acid numbers of from 5 to 30 which are composed of an acid number of from 1 to 10, as determined after partial esterification with the drying fatty acids, and of an acid number of from 1 to 29 resulting from the reaction with dicarboxylic acid anhydrides to form semiesters. Lacquer binders such as these show extremely good pigment absorption and wetting properties and are distinguished by good drying properties. For the air-drying range, the binders are intended to have final acid numbers of from 5 to 15, more particularly from 5 to 12, which are composed of the acid number of from 1 to 10 after partial esterification with the drying fatty acids and of an acid number of from 1 to 14, more particularly from 2 to 11, resulting from formation of the semiesters.

It is known that copolymers of styrene, hydroxyalkyl(meth) acrylates, (meth)acrylates and polymerisable mono- or di-carboxylic acids can be produced and mixed with castor oil for use as stoving lacquer binders crosslinkable at elevated temperatures following the addition of aminoplasts, such as melamine- or urea-formaldehyde resins. By mixing with castor oil, it is possible to reduce the stoving temperatures to 80°–150° C. (cf. British patent specifications Nos. 1,177,929 and 1,104,446). One serious disadvantage of these binders is that they cannot be used as air-drying binders.

It is also known (cf. U.S. Pat. No. 3,284,385) that drying unsaturated fatty acids can be esterified with hydroxyalkylmono(meth) acrylates and that the resulting modified monomers can be anionically copolymerised with other monomers to form copolymers suitable for use as air-drying and/or oven-drying lacquer binders. Unfortunately, the anionic polymerisation reaction involves considerable technical outlay and requires particularly pure monomers free from alcohol and water. In addition, secondary reactions of the anionic initiator or the "living polymer" with the ester groups (ketone formation) are possible. As can be seen from column 7, lines 55 to 75 of the above mentioned Patent Specification, radical polymerisation of the above mentioned monomers results in the formation of crosslinked polymers because the double bonds of the drying fatty acids also polymerise. In addition, the durability of the coatings produced from the lacquer binders can be adversely affected by the presence of the anionic initiators in the lacquer binders.

According to U.S. Pat. No. 3,288,736, styrene, hydroxyalkyl(meth) acrylates and (meth)acrylates inter alia are copolymerised and subsequently esterified with drying or non-drying fatty acids to form lacquer binders having acid numbers below 20 (according to Examples 12 to 20) and OH-numbers of from 10 to 90. In the case of air-drying systems, the OH-numbers are intended to be in the range of from 10 to 20. One disadvantage of these systems lies in the relatively high acid numbers for air-drying lacquers which, as can be seen from the Examples, are in the range of from 12 to 20. It can be seen from these figures that up to 10% of free fatty acids in the binder were not esterified onto the polymer molecule with the result that a corresponding proportional number of polymer molecules is missing from the drying fatty acids. In addition, free fatty acids, like the native oils, show poor drying properties because numerous oxidative bonds have first to be attached before a crosslinked coating is formed. One example of this is the very long crosslinking time of the pure oils by comparison with the already pre-condensed alkyd resins of relatively high molecular weight. Finally, these binders lack the carboxyl groups in the polymer molecule which are so valuable for wetting pigments.

The problem of improving the pigment absorption and wetting of air-drying lacquer binders in the case of copolymers of styrene, glycidyl(meth)acrylate and (meth)acrylates crosslinked with drying fatty acids was solved by acidifying these copolymers with dicarboxylic acid anhydrides to form products having acid numbers of from 20 to 60 (cf. British patent specification No. 1,227,398). The binders thus modified show extremely good pigment absorption and wetting, apparently by virtue of their high acid numbers, coupled with rapid drying, fairly constant drying times and good processibility, and give hard, highly elastic films. Like many air-drying lacquers, however, the finished lacquers show a tendency on storage towards thickening and undesirable skin formation, so that they necessitate the addition of an anti-skinning agent. If anti-skinning agents, such as the oximes or phenol compounds normally used for air-drying lacquers, are added to the described acrylate resin lacquers, skin formation during storage of the lacquers is prevented or at least considerably delayed. Unfortunately, the lacquers thus prepared show a very considerable delay in drying, particularly to the tack-free stage. This delay in drying hampers the practical use of these air drying acrylate lacquers and is even greater, the longer the lacquers are stored before application. Application to the binders according to U.S. Pat. No. 3,288,736 of the measure of acidifying OH-group-containing acrylate resins esterified with drying fatty acids with dicarboxylic acid anhydrides to form semiesters must be expected to involve the same disadvantages, particularly in the case of air-drying systems.

It is also known that the presence of free organic acids in ester-based lacquers or coloured primers gives rise to difficulties, for example due to the formation of soaps with basic pigments, which leave the mixture with an undesirably high viscosity. In addition, the presence of 10% of free acids impairs the metallic lustre of aluminium paints and reduces the resistance of the paints to moisture. (cf. German Auslegeschrift No. 1,096,518, column 1, lines 1 to 3). In the case of combinations of lacquer resins based on alkyd resins with aminoplasts, excessively high acid numbers give rise to excessively rapid hardening and, according to British patent specification No. 1,045,199, lead to poor mechanical and chemical film properties and, in combinations of polyesters with isocyanates, to bubble formation (cf. British Pat. No. 896,711).

An object of the present invention is to modify the air-drying binders according to U.S. Pat. No. 3,288,736 in such a way that, in addition to very good pigment absorption and wetting, very good lacquer processibility, extreme hardness, high elasticity and high gloss of the dried film, constant drying times under constant drying conditions are obtained, even after the addition of an anti-skinning agent. On the other hand, the binders are intended to be able to be used as oven-drying systems, even in combination with aminoplasts, phenoplasts or masked polyisocyanates.

According to the invention, this object is achieved by partially esterifying copolymers of styrene, hydroxyalkyl(meth)acrylates and (meth)acrylates having a certain percentage composition with drying fatty acids to form products having acid numbers of from 1 to 10, followed by acidification with dicarboxylic acid anhydrides to form semiesters having overall acid numbers of from 5 to 30, preferably from 5 to 15.

Accordingly, the present invention provides air-drying and oven-drying, preferably air-drying, lacquer binders based on copolymers having copolymerised units of 5 to 40% by weight of styrene
10 to 50% by weight of at least one hydroxyalkyl(-meth)acrylate with 2 to 4 carbon atoms in the alkyl group, and
10 to 40% by weight of at least one (meth)acrylic acid ester with 1 to 10 carbon atoms in the alcohol component, esterified with
10 to 50% by weight, based on the copolymer and drying fatty acids and dicarboxylic acid anhydride, of drying fatty acids, characterised in that from 10 to 70 mole % of the hydroxyl groups of the incorporated hydroxyalkyl(meth)acrylate units are esterified with drying fatty acids, after which from 0.5 to 20 mole % of the hydroxy groups of the incorporated hydroxyalkyl(meth)acrylate units are reacted with from 0.5 to 10% by weight, based on the lacquer binder, of at least one dicarboxylic acid cyclic anhydride to form the semiester of the corresponding dicarboxylic acid having an overall acid number of from 5 to 30, the overall acid number being composed of an acid number of from 1 to 10, as determined after esterification with the drying fatty acids and emanating from free fatty acids, and an acid number of from 1 to 29, as determined on the solvent-free lacquer binder (end product) and emanating from formation of the semiester. The overall acid number is preferably in the range of from 10 to 30.

It is preferred to use copolymers of
5 to 20% by weight of styrene,
20 to 40% by weight of 2-hydroxyethyl(meth)acrylate, 2-hydroxypropyl(meth)acrylate or mixtures thereof, and
20 to 40% by weight of at least one (meth)acrylic acid alkyl ester with 1 to 8 carbon atoms in the alcohol component, the copolymer preferably being esterified with from 20 to 40% by weight, based on the binder, of drying fatty acids. The dicarboxylic acid cyclic anhydrides preferably containing from 4 to 9 carbon atoms are preferably used in quantities of from 0.5 to 3% by weight, based on the binder. In the context of the invention, the binder means the copolymer and drying fatty acids and dicarboxylic acid anhydride.

Dicarboxylic acid anhydrides suitable for addition with the hydroxyl groups of the reaction products of the hydroxyalkyl(meth)acrylate copolymer and drying fatty acids are, for example, succinic acid anhydride, maleic acid anhydride, phthalic acid anhydride, tetrahydrophthalic acid anhydride and isomers thereof and mixtures of these tetrahydrophthalic acid anhydrides, hexahydrophthalic acid anhydride, methyl hexahydrophthalic acid anhydride, and endomethylene tetrahydrophthalic acid anhydride. It is preferred to use tetrahydrophthalic acid anhydrides.

The drying fatty acids used are natural, drying fatty acids, and/or isomerised drying fatty acids, preferably mixtures of natural drying fatty acids and isomerised drying fatty acids, particularly isomerised drying fatty acids.

Natural drying fatty acids are, for example, the fatty acids of linseed oil, soya bean oil, sunflower oil, cottonseed oil, peanut oil, tall oil and safflower oil in their natural composition, i.e. these natural drying fatty acids consist of mixtures of saturated mono- and/or polyunsaturated fatty acids with drying properties, the polyunsaturated fatty acids mostly containing isolated double bonds. The fatty acids of the above-mentioned oils have, for example, substantially the following compositions in % by weight:

|  |  | Linseed oil | Soya bean oil | Sunflower oil | Cotton seed oil | Peanut oil | Tall oil | Safflower |
|---|---|---|---|---|---|---|---|---|
| Myristic acid | ($C_{14}$) | 0.2 | — | — | 3.3 | 0.5 | — | 0.1 |
| Palmitic acid | ($C_{16}$) | 5.6 | 6.5 | 3.5 | 19.9 | 7.8 | 4.6 | 4.5 |
| Stearic acid | ($C_{18}$) | 3.5 | 4.5 | 2.9 | 1.3 | 3.1 | 4.6 | 2.0 |
| Arachic acid | ($C_{20}$) | 0.6 | 0.7 | 0.6 | 0.6 | 2.4 | — | 0.4 |
| Behenic acid | ($C_{22}$) | — | — | — | — | 3.1 | — | 0.4 |
| Lignoceric acid | ($C_{24}$) | 0.1 | — | 0.4 | — | 1.1 | — | — |
| Oleic acid | ($C_{18}$) | 21.0 | 33.5 | 34.1 | 29.6 | 56.0 | 30 | 20 |
| Linoleic acid | ($C_{18}$) | 24.0 | 52.5 | 58.5 | 45.3 | 26.0 | 24 | 70 |
| Linolenic acid | ($C_{18}$) | 45.0 | 2.3 | — | — | — | 8 | 3 |

The natural drying fatty acids contain approximately
5 to 25% by weight of saturated $C_8$-$C_{24}$-fatty acids,
20 to 60% by weight of monoolefinically unsaturated $C_{18}$-fatty acids, particularly oleic acid, and
20 to 70% by weight of tri- and/or di-unsaturated $C_{18}$-fatty acids with mostly isolated double bonds.

The isomerised drying fatty acids used generally contain from 30 to 75% by weight of conjugated fatty acids and may be obtained by isomerising the natural drying fatty acids. Conjugated fatty acids are $C_{18}$-fatty acids with at least 2 conjugated double bonds. Examples of conjugated fatty acids are 9,11-linoleic acid, 10,12-linoleic acid, 8,10-octadecadienoic acid, eleostearic acid (=9,11,13-octadecatrienoic acid), pseudoeleostearic acid (=10,12,14-octadecatrienoic acid), parinaric acid (=9,11,13,15-octadecatetraenoic acid), licanic acid (=4-keto-9,11,13-octadecatrienoic acid) and the stereoisomers of the above-mentioned acids, preferably 9,11-linoleic acid and eleostearic acid and their stereoisomers.

The natural drying fatty acids are isomerised by known methods as described, for example, in Ullmanns Enzyklopadie der technischen Chemie (1956), Vol. 7, pages 538–539.

The acids mentioned above are described for example in Ullmanns Enzyklopadie der technischen Chemie (1956), Vol. 7, pages 468 to 486. See also Beilsteins Handbuch der organischen Chemie (1961), 4th Edition, Vol. 2, Third Supplement, pages 1476 to 1520.

The copolymers which are used for esterification with the drying fatty acids and for semiester formation with tetrahydrophthalic acid anhydride are produced by known polymerisation processes. They contain the incorporated monomers in random distribution and generally have average molecular weights ($\overline{M}_n$, number average) of from about 2000 to 8000, preferably from 2000 to 4000, as determined in xylene by the vapour pressure reduction method. Lower molecular weights adverseley affect the drying activity, even in the presence of oxides.

Esterification of the hydroxyl group-containing copolymers with the fatty acid is generally carried out at temperatures in the range of from about 160° C. to 200° C. and preferably at temperatures in the range of from 170° C. to 180° C. Esterification is preferably carried out in organic solvents, such as xylene, ethyl glycol acetate or solvent naphtha.

The addition reaction of the dicarboxylic acid anhydrides and mixtures of these anhydrides with the hydroxyl groups of the fatty acid-containing copolymers obtained to form semiesters is generally carried out at temperatures in the range of from about 50° C. to 180° C. and preferably at temperatures in the range of from 100° C. to 140° C.

Preferably from 30 to 60 mole % of the hydroxyl groups of the incorporated hydroxyalkyl(meth)acrylate units are esterified with the drying fatty acids, after which preferably from 1 to 10 mole % of the hydroxyl groups of the incorporated hydroxyalkyl(meth)acrylate units are reacted with the dicarboxylic acid anhydrides to form the semiester of the corresponding dicarboxylic acid.

The esterification of the hydroxyl group-containing copolymers with the fatty acids is always continued up to an acid number of from 1 to 10 (solvent-free esterification product), irrespective of whether air-drying or oven-drying binders are to be produced. After the following reaction with dicarboxylic acid anhydride, the acid numbers (overall acid number) of the solvent-free binder can amount to between 5 and 30.

For the air-drying range, the overall acid number of the solvent-free binder should amount to between 5 and 15 and preferably to between 5 and 12. In other words, acid numbers of from 1 to 14 and preferably from 2 to 11 result from the reaction with the dicarboxylic acid anhydride. The value 2 in the preferred range is obtained for an acid number of 10 after estification with drying fatty acids and for an overall acid number of 12.

In addition, the binders may be used for for the stoving lacquer sector when the overall acid number is in the range of from 15 to 30, acid numbers of from 14 to 19 resulting from the reaction with the dicarboxylic acid anhydride. The binders according to the invention make it possible for the first time to produce the range of acrylates containing air-drying groups with any hydroxyl and fatty acid relations and, through the measure of acidification, to produce mixed acid types which do not suffer any deterioration in drying and which nevertheless combine the advantages of the pigment-wetting-promoting properties and which, in addition, may also be made oven-drying by self-catalysis with melamine resins.

The binders according to the invention generally have average molecular weights $\overline{M}_n$ (number average) of from about 2000 to 10,000, as determined in xylene by the vapour pressure reduction method. They are distinguished by excellent pigment absorption and wetting, minimal yellowing, rapid drying and good lacquer processibility and give hardened films combining high gloss with good elasticity and hardness.

The binders according to the invention are dissolved in known manner in organic solvents, for example xylene, mixtures of aromatic solvents, ethyl glycol acetate and, proportionately, white spirit and are processed optionally in the form of clear lacquers, but preferably pigmented with the usual pigments, with such additives as levelling agents, siccatives and the like, in the usual quantities.

Aldoximes or ketoximes, for example butanone oxime, may be used as antiskinning agents in quantities of from 0.1 to 2.0% by weight, based on solid binder.

The novel binders according to the invention may be the sole binder of a lacquer system, although they may of course also be combined with other resins for modifying properties, as is standard practice in lacquer chemistry.

In order to vary the properties of the resulting films, it is also possible (and this is another particular advantage) to add to the binders according to the invention polyisocyanates and melamine resins which, through hydroxyl groups present, if any, bring about addition crosslinking and provide the fresh lacquer coatings with greater hardness and resistance combined with faster readiness for assembly.

The lacquer films may be produced by the usual methods, such as spread coating, spray coating dip coating, knife coating and the like, onto suitable substrates, for example of metal, wood, paper, glass, ceramics, stone, concrete, plastics, etc. The films are generally dried at temperatures of from 15° to 30° C., although lower or higher drying temperatures may also be applied.

The percentages and parts quoted in the following Examples are by weight, unless otherwise stated.

Comparison Test 1

This Comparison Test shows that, even after the addition of antiskinning agents of the usual type, white lacquers based on binders corresponding to British patent specification No. 1,227,398 dry to the tack-free stage much more slowly and, depending upon the recipe selected, gel earlier than white lacquers produced with binders corresponding to the invention. In the absence of an antiskinning agent, white lacquers produced with binders corresponding to British patent specification No. 1,227,398 have no shelf life.

In accordance with Example 1 of German Offenlegungsschrift No. 1,720,697 (=British patent specification No. 1,227,398), a solution of 120 g of styrene, 78 g of methyl methacrylate and 102 g of glycidyl methacrylate in 500 g of xylene is heated unter nitrogen for 25 hours to 80° C. following the addition of 2.8 g of azodiisobutyronitrile as catalyst and 0.8 g of dodecyl mercaptan as regulator. Thereafter the conversion amounts to 100% and a clear colourless polymer solution is obtained, having an acid number of 1 and a flow-out viscosity, as measured in a 4 mm DIN cup, of 28 seconds at 20° C. Following the addition of 194 g of a technical linoleic acid with an acid number of 200, this solution is stirred under nitrogen for 8 hours at 140° C. Thereafter the solutions have an acid number of 5.

The clear pale yellow reaction solution is then stirred under nitrogen for 75 minutes at 140° C with 25 g of phthalic acid anhydride, after which a lacquer solution having a solids content of approximately 50% by weight and an acid number of 16, corresponding to an acid number of approximately 32, based on solid binder, is obtained.

Recipe A

A white lacquer is prepared from:
170 parts of binder solution (50%)

65 parts of titanium dioxide pigment (rutile type)
64 parts of xylene
1.2 parts of zinc octoate solution (8% metal content)
3 parts of ethyl glycol acetate
1.5 parts of antiskinning agent (an approximately 55% solution of butanone oxime in white spirit)
3 parts of silicone oil solution, 1% in xylene
1 part of cobalt octoate solution (6% metal content)
3.3 parts of zirconium solution (6% metal content).

A film produced from the white lacquer is tack-free after 13 hours and therefore shows a delay in drying caused by oximes of approximately 10 hours.

Although a lacquer of the same composition, except for the absence of an antiskinning agent, dries much more quickly immediately after production (dust-dry in 15 minutes; tack-free after 3 hours), the lacquer itself forms a skin and gels after only a few hours. By comparison, a lacquer of the same binder corresponding to the recipe of British patent specification No. 1,227,398 behaves equally unfavourably.

Comparison Example 2 (with U.S. Pat. No. 3,288,736)

This Comparison Example shows the equally unsatisfactory drying properties of these binders. In accordance with Example 1 of the Patent Specification,
25.1 parts of hydroxypropyl methacrylate
30.0 parts of methyl methacrylate
5.9 parts of styrene
3.0 parts of di-tert.-butyl peroxide
1.0 parts of lauryl mercaptan
are copolymerised as described and then esterified at 220° C. with 35 parts of tall oil fatty acid up to an acid number of approximately 20 and to the viscosity $Z_1$ corresponding to a viscosity of approximately 2000 cP, as measured in the 60% form as supplied at a temperature of 20° C.

Although a white lacquer of this binder produced in accordance with recipe A is dust-dry after 30 minutes, it is only tack-free after 24 hours.

Investigation into the causes of this slow drying shows that the base polymers have an average molecular weight of approximately 1300 (number average).

Comparison Test 3

In order to clarify the obvious assumption that an increase in molecular weight is all that is necessary to eliminate this dificiency of the pigmented white lacquers, Comparison Test 2 was repeated except that the reaction with the tall oil fatty acid was continued until a relatively high molecular weight binder having a molecular weight $M_n$ of 2600 was formed. The viscosity of these products further condensed at 220° C. amounted to 8500 cP (60% in xylene) at 20° C. which lies beyond the Gardner scale of Z 4.

A white lacquer based on this binder produced in accordance with recipe A dries relatively quickly. It is dust-dry after 30 minutes and tack-free after 3 hours.

On the other hand, it is attended by the serious disadvantage that, in order to be processible, it requires a high proportion of organic solvents.

Whereas the binder of Comparison Test 2 has a viscosity of 37" (DIN 53211) for a solids content of 40%, the binder of Comparison Test 3 has a viscosity of 97" for the same solids content and, in order to acquire the same viscosity, has to be further diluted with xylene.

EXAMPLE

In accordance with Comparison Test 2, a copolymer is prepared from
25.1 parts of hydroxy propyl methacrylate 30.0 parts of methyl methacrylate
5.9 parts of styrene
3.0 parts of di-tert.-butyl peroxide 1.0 part of dodecyl mercaptan
by copolymerisation as described.

In the second stage, however, esterification is carried out with only 30.0 parts as opposed to 35.0 parts of tall oil fatty acid under otherwise the same conditions up to an acid number of 9, followed by further reaction for 15 minutes at 120° C. with 0.8 parts of tetrahydrophthalic acid anhydride to form a semiester having an acid number of 10 and a viscosity of 9590 cP (60% in xylene) at 20° C. or 66" (40% in xylene) in accordance with DIN 53211) and a molecular weight $M_n$ of 2200.

In accordance with recipe A, this semiester of distinctly lower viscosity provides a readily processible white lacquer which is dust-dry in 30 minutes and tack-free in 3 hours and which has the advantage of a lower solvent demand compared with the various white lacquer of Comparison Test 3.

We claim:

1. An air-drying and oven-drying lacquer binder based on a copolymer having copolymerised units of
   5 to 40% by weight of styrene,
   10 to 50% by weight of at least one hydroxyalkyl(meth)acrylate with 2 to 4 carbon atoms in the alkyl group, and
   10 to 40% by weight of at least one (meth)acrylic acid ester with 1 to 10 carbon atoms in the alcohol component, esterified with
   10 to 50% by weight, based on the copolymer and drying fatty acid and dicarboxylic acid anhydride, of a drying fatty acid,
from 10 to 70 mole % of the hydroxyl groups of the incorporated hydroxyalkyl(meth)acrylate units having been esterified with the drying fatty acid and thereafter from 0.5 to 20 mole % of the hydroxyl groups of the incorporated hydroxyalkyl(meth) acrylate units having been reacted with from 0.5 to 10% by weight, based on the lacquer binder, of at least one dicarboxylic acid cyclic anhydride to form the semiester of the corresponding dicarboxylic acid having an overall acid number of from 5 to 30, the overall acid number being composed of an acid number of from 1 to 10, as determined after esterification with the drying fatty acid and emanating from the free fatty acid, and of acid number of from 1 to 29, as determined on the solvent-free lacquer binder (end product) and emanating from formation of the semiester.

2. An air-drying lacquer binder as claimed in claim 1, having an overall acid number of from 5 to 15.

3. An oven-drying lacquer binder as claimed in claim 1, having an overall acid number of from 15 to 30.

* * * * *